United States Patent [19]

Abebe et al.

[11] Patent Number: 4,612,028

[45] Date of Patent: Sep. 16, 1986

[54] POLARIZATION-PRESERVING SINGLE MODE FIBER COUPLER

[75] Inventors: Moges Abebe, Washington, D.C.; William K. Burns, Alexandria; Carl A. Villarruel, Burke, both of Va.

[73] Assignee: The United States of America as represented by The Secretary of the Navy, Washington, D.C.

[21] Appl. No.: 785,107

[22] Filed: Oct. 7, 1985

Related U.S. Application Data

[63] Continuation of Ser. No. 561,866, Dec. 16, 1983, abandoned.

[51] Int. Cl.⁴ ............................. C03B 23/20
[52] U.S. Cl. ............................ 65/4.2; 65/4.3; 65/31
[58] Field of Search .............. 65/4.2, 4.21, 4.3, 31; 350/96.15, 96.21; 156/158

[56] References Cited

U.S. PATENT DOCUMENTS

| | | | |
|---|---|---|---|
| 4,377,403 | 3/1983 | McLandrich | 65/4.21 |
| 4,426,215 | 1/1984 | Murphy | 65/4.21 |
| 4,439,221 | 3/1984 | Smyth et al. | 65/4.21 |

OTHER PUBLICATIONS

Namihira et al, "Birefringence in Elliptical-Cladding Single-Polarisation Fiber", Electronics Letters, 1/21/82, vol. 18, pp. 90–92.
M. Kawachi et al. "Fabrication of Single-Polarisation Single-Mode Fibre Couplers" Elec. Lett. vol. 18, p. 962.
C. A. Villarruel et al. "Fused Single Mode Fibre Access Couplers" Elec. Lett. vol. 17, p. 243.
T. Katsuyama et al. "Low-Loss Single-Polarisation Fibres" Elec. Lett. vol. 17, p. 473.
B. S. Kawasaki, et al., "Biconical-Taper Single-Mode Fiber Coupler", Optics Lett., vol. 6, p. 327.

*Primary Examiner*—S. Leon Bashore
*Assistant Examiner*—Michael K. Boyer
*Attorney, Agent, or Firm*—Robert F. Beers; Robert W. Adams; Edward V. Hiskes

[57] ABSTRACT

A polarization-preserving single mode fiber coupler, fabricated by a method which does not require mutually aligning the fiber polarization axes provided the actual misalignment angle is not close to 90°. The protective jackets from two or more polarization-preserving single mode birefringent fibers are partially removed and the fibers are twisted around each other to bring them into contact over the jacketless region and provide a coupling length that is large compared to the birefringent beat length of the fibers. Next, the cladding layers of the fibers in the contacting region are partially etched without degrading the birefringent beat length over their coupling length. Then, the etched region is heated to the softening point of the fibers while axial tension is applied to taper and fuse the etched region until a desired coupling of the fibers is achieved. Finally, a mechanical supporting structure is added to the tapered and fused region of the fibers.

3 Claims, 12 Drawing Figures

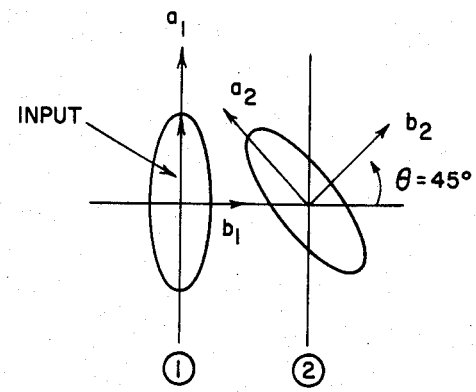

FIG. 1

```
┌─────────────────────────┐
│ PARTIALLY REMOVING THE  │
│ PROTECTIVE JACKETS OF   │     STEP
│ TWO OR MORE PPSM        │     (a)
│ BIREFRINGENT FIBERS     │
└─────────────────────────┘
            │
┌─────────────────────────┐
│ TWISTING THE FIBERS     │
│ AROUND EACH OTHER TO    │
│ CONTACT THEM OVER THE   │     STEP
│ JACKETLESS REGION AND   │     (b)
│ TO PROVIDE A COUPLING   │
│ LENGTH THAT IS LARGE    │
│ COMPARED TO THEIR       │
│ BIREFRINGENT BEAT LENGTH│
└─────────────────────────┘
            │
┌─────────────────────────┐
│ PARTIALLY ETCHING THE   │
│ CLADDING LAYERS OF THE  │     STEP
│ FIBERS IN THE CONTACTING│     (c)
│ REGION WITHOUT DEGRADING│
│ THE BEAT LENGTH         │
└─────────────────────────┘
            │
┌─────────────────────────┐
│ RAISING THE TEMPERATURE │
│ OF THE ETCHED REGION    │     STEP
│ CLOSE TO THE FIBER      │     (d)
│ SOFTENING POINT         │
└─────────────────────────┘
            │
┌─────────────────────────┐
│ SIMULTANEOUSLY APPLYING │
│ AXIAL TENSION TO TAPER  │     STEP
│ AND FUSE THE ETCHED     │     (e)
│ REGION                  │
└─────────────────────────┘
            │
┌─────────────────────────┐
│ CEASING APPLICATION OF  │
│ THE AXIAL TENSION AND   │     STEP
│ HEATING WHEN A DESIRED  │     (f)
│ COUPLING IS ACHIEVED    │
└─────────────────────────┘
            │
┌─────────────────────────┐
│ ADDING A MECHANICAL     │
│ SUPPORTING STRUCTURE    │     STEP
│ TO THE TAPERED AND FUSED│     (g)
│ REGION OF THE FIBERS    │
└─────────────────────────┘
```

FIG. 2

POLARIZATION-PRESERVING SINGLE MODE FIBER COUPLER

This application is a continuation of application Ser. No. 561,866, filed Dec. 16, 1983, now abandoned.

BACKGROUND OF THE INVENTION

The present invention relates generally to fiber optical couplers, and more particularly to the fabrication of polarization-preserving fiber optical couplers.

Optical fiber-to-fiber couplers for coupling an optical beam from one or more fibers to another fiber or fibers are known in the art.

Single mode fiber couplers have been fabricated in several ways with nominally isotropic fiber. One of the difficulties with these couplers has been their apparent inability, in most cases, to preserve input polarization states through the coupler. Instead, linearly polarized inputs are often transformed into elliptical states on exiting the coupler. The recent development of high-birefringence fibers—called polarization-preserving single mode (PPSM) fibers—that can maintain a given state of polarization over long lengths, raised the possibility of using them to fabricate couplers which maintain polarization throughout the coupler. Since alignment of the polarization axes of the fibers forming the coupler was thought to be crucial, and this latter task is technically difficult, only recently has such a coupler been reported. The term "polarization axes" is used herein in its conventional sense as the principal directions in a birefringent fiber for which the velocity of the linearly-polarized wave is different. This prior art coupler is disclosed in Electronic Letters 18, pp. 9624 (1981) by M. Kawachi et al. The method of fabricating this coupler disadvantageously focuses on a scheme to achieve mutual alignment of the fiber polarization axes.

SUMMARY OF THE INVENTION

Accordingly, one object of this invention is to fabricate a polarization-preserving single-mode fiber coupler.

Another object is to fabricate such a coupler using a procedure that relaxes the requirement for alignment of the polarization axes of the fibers forming the coupler.

These and other objects of the invention are achieved by a method of fabricating a polarization-preserving single mode fiber coupler which does not require mutually aligning the fiber polarization axes provided the actual misalignment angle is not close to 90°. The protective jackets from two or more polarization-preserving single-mode birefringent fibers are partially removed and the fibers are twisted around each other to bring them into contact over the jacketless region and provide a coupling length that is large compared to the birefringent beat length of the fibers. Next, the cladding layers of the fibers in the contacting region are partially etched without degrading the birefringent beat length over their coupling length. Then, the etched region is heated to the softening point of the fibers while axial tension is applied to taper and fuse the etched region until a desired coupling of the fibers is achieved. Finally, a mechanical supporting structure is added to the tapered and fused region of the fibers.

In another aspect, the invention involves the coupler prepared in accordance with the above-described method.

In carrying out the inventive method, no attempt is made to mutually align the polarization axes of the fibers forming the coupler, yet the coupler does preserve polarization. This is attributed to a phase mismatch between unlike modes that arises from the large inherent birefringence in the fibers. A simplified estimate using coupled mode theory indicates that, for a 3 dB coupler with a 1 cm. coupling length made from 3.4 mm-beat-length fiber, coupling between unlike modes is approximately 20 dB below coupling between like modes, assuming polarization alignment in each case. This is a significant result because it implies that satisfactory polarization performance can be achieved while avoiding the step of axis alignment, which is technically difficult.

This simplified estimate is arrived at in the following manner. Referring to FIG. 1, assume the two fibers forming the coupler are aligned in the coupler with their polarization axes $a_1$, $b_1$, and $a_2$, $b_2$ at 45 degrees as shown. With an input on $a_1$, there is a phase-matched interaction between $a_1$ and $a_2$, and a phase-mismatched interaction between $a_1$ and $b_2$ with a mismatch in phase velocity of $\Delta\beta = 2\pi/L_p$, where $L_p$ = fiber beat length. If there is a 3 dB coupling to $a_2$ in a length L=1 cm., the maximum power coupled to $b_2$ is $$P_{max}(b_2) = \frac{K^2}{K + \left(\frac{\Delta\beta}{2}\right)^2} \approx \frac{1}{100}$$

where the coupling constant $K = \pi/4L$ is assumed isotropic. Obviously under these conditions, alignment is not critical as long as the misalignment angle $\theta$ is not too close to 90 degrees. In the example given power coupled to the unwanted mode is down by 20 dB. The primary requirement for operation in this mode is that the ratio $L//L_p$ (coupling length/fiber beat length) be large compared to unity and that the fiber beat length not be degraded in the coupling region. An additional consequence of this approach is that variation of the misalignment angle $\theta$ in the coupling region is not harmful and, in fact, may be beneficial.

The inventive method can be used with any elliptical core or strain induced birefringent fiber with sufficiently short beat length less than or equal to 5 mm. It should be particularly useful in the fabrication of polarization-preserving 3×3 couplers where axis alignment, if required, would be very difficult.

The couplers prepared by the inventive method exhibit all of the features of prior art fused fiber couplers—low loss, ruggedness, variable splitting ratio, etc.—except that they now have polarization isolation of 10 dB or better. The couplers are directly compatible with the polarization-holding fiber, since they are made with that fiber. Low loss splices, etc. can be easily achieved. Hybrid devices using both isotropic and birefringent fibers are possible and could serve as polarizing beam splitters.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 1 shows polarization axis alignment within the coupling region of two fibers forming a coupler.

FIG. 2 is a flow chart of the steps of the fabrication method for the polarization-perserving single mode fiber coupler in accordance with the invention.

DESCRIPTION OF THE PREFERRED EMBODIMENT

Referring to FIG. 2, the method of fabricating a polarization-perserving single mode fiber coupler is illustrated as comprising seven steps, which will hereinafter be designated steps (a) through (g).

The first step, step (a) is the partial removal of the protective jacket from two or more polarization-preserving single-mode birefringent fibers.

The next step, step (b) is the twisting of the fibers around each other to bring them into intimate contact over the jacketless region and provide a coupling length that is large compared to the birefringent beat length of the fibers.

The third step, step (c) is the partial etching of the cladding layers of the fibers in the contacting region without degrading their birefringent beat length over the coupling region.

The fourth step, step (d) is the raising of the temperature of the etched region close to the softening point of the fibers.

The next step, step (e) is the simultaneous application of axial tension to the fibers to taper and fuse the etched region of the fibers.

The sixth step, step (f) is ceasing to apply the axial tension and heating when a desired coupling of the fibers is achieved.

The last step, step (g) is the adding of a mechanical supporting structure to the tapered and fused region of the fibers.

The method does not require alignment of the fiber polarization axes provided the misalignment angle is not close to 90 degrees.

For a clearer understanding of the invention. a specific example of it is set forth below. This example is merely illustrative and is not to be understood as limiting the scope and underlying principles of the invention in any way.

EXAMPLE

Figure 3A:
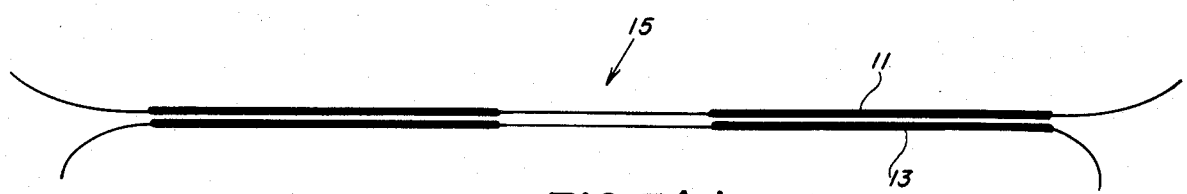
FIGS. 3(a)-3(g) illustrate steps in the fabrication of one embodiment of a polarization-perserving single made fiber coupler in accordance with the invention.
Figure 3B:
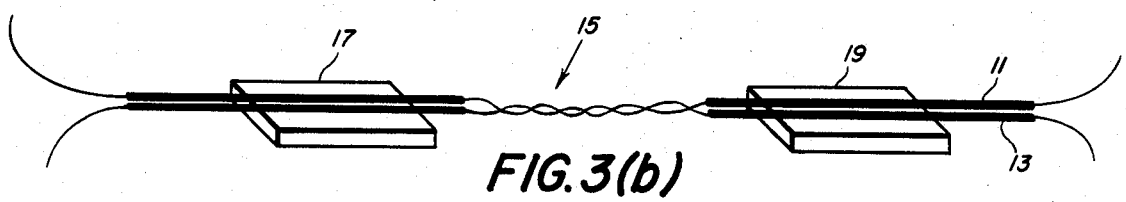
Figure 3C:
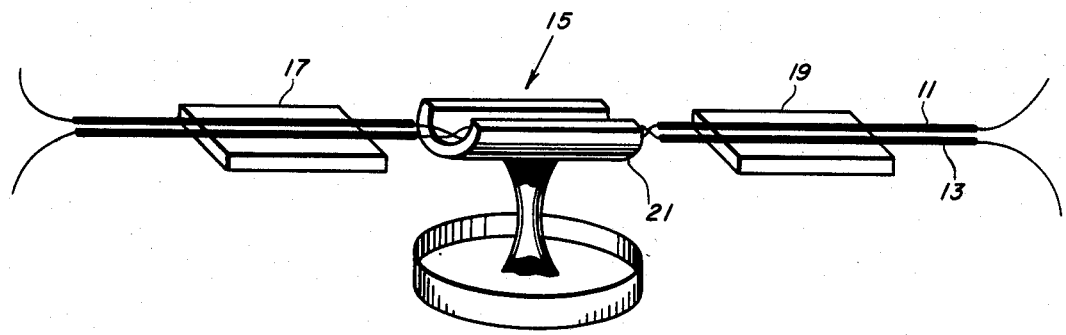
Figure 3D:
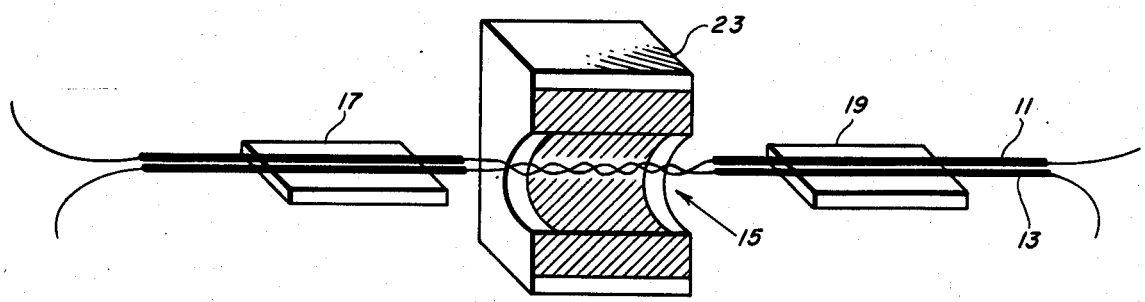
Figure 3E:
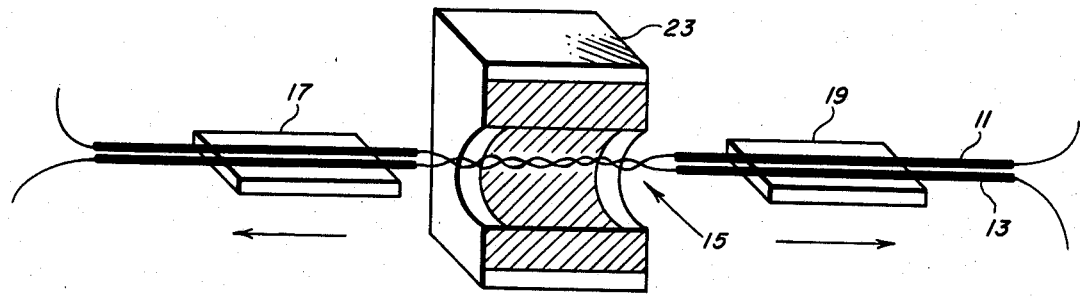
Figure 3F:
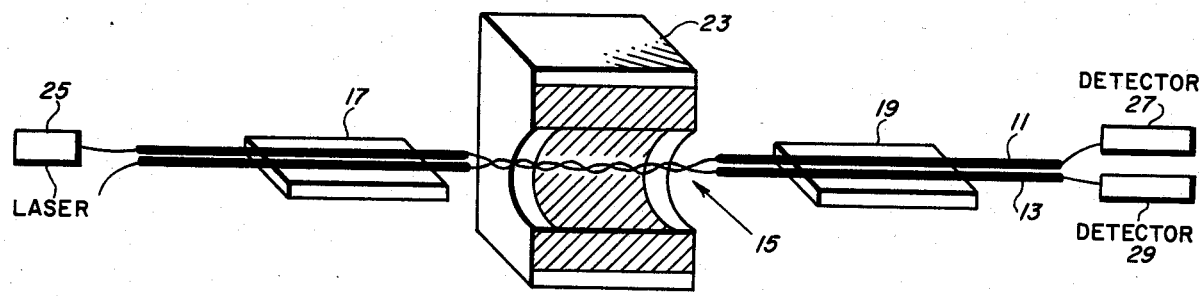
Figure 3G:
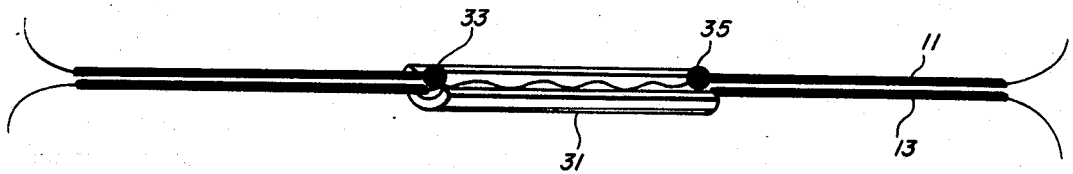

Referring to FIGS. 3(a)-3(f), a coupler was fabricated using polarization-preserving single-mode (PPSM) fiber commercially available from Hitachi Ltd., Tokyo, Japan. This PPSM fiber has been described in the article "Low Loss Single Polarization Fiber" by T. Katsuyama et al. in Electronic Letters 17, pp. 473-4 (1981), and comprises four successive glass layers—a core, an optical cladding, an elliptical stress-inducing jacket, and an outer cladding. A protective jacket of plastic surrounds the fiber. The elliptical jacket imparts an anisotropic stress on the core thus providing sufficient optical birefringence to maintain a linear polarization state. The fiber is designed to operate near 0.8 $\mu$m. and is characterized by a core diameter of 4.7 $\mu$m, a short birefringent beat length of 3.4 mm and an attenuation of 3.8 dB/km. Since the outer cladding's index of refraction is high relative to that of the inner optical cladding, it was advantageous to remove as much of the outer cladding as possible, by etching, to avoid lossy cladding modes after fusion of the fibers to form the coupler. First, the protective jackets of two of the PPSM fibers 11 and 13 were removed over a region 15 several centimeters in length, as shown in FIG. 3(a). Then the two PPSM fibers 11 and 13 were twisted around each other so as to be in intimate contact over the jacketless region 15 and provide a suitably large ratio of coupling length to beat length, as shown in FIG. 3(b). The ends of the PPSM fibers 11 and 13 were secured to translation blocks 17 and 19. Next, the outer claddings of the PPSM fibers 11 and 13 in the jacketless region 15 were partially etched by immersing them in a buffered hydrofluoric (2:1) ($NH_4F:HF$) acid solution disposed in an etching container 21, as shown in FIG. 3(c). During this step, care was taken to remove the outer claddings only up to the point where the elliptical stress-inducing jacket was just exposed. This removed as much of the outer cladding as possible, thus reducing the effect of cladding modes, while still maintaining the intrinsic fiber birefringent beat length. It was found that etching times of more than about 70 minutes changed the inherent birefringence of the fibers significantly. Care was taken not to exceed this point. Then, the jacketless region 15 of the PPSM fibers 11 and 13 was inserted in a miniature oven 23 (shown in section) and the temperature of the jacketless region was raised close to the softening point of the fibers, as shown in FIG. 3(d). At the same time, axial tension was applied to the PPSM fibers 11 and 13 by translating the blocks 17 and 19 in opposite directions, to taper and fuse the jacketless region 15. Prior to the etching step, the polarization vector in the output of a polarized laser 25 had been aligned on one of the birefringent axes of one fiber 11 by maximizing the output visibility. Now, the splitting of the laser output by the coupler was measured by detectors 27 and 29 disposed at the far ends of the fibers 11 and 13 (hereinafter referred to as the "through" and "tap" fibers, respectively), as shown in FIG. 3(f). When the through and tap fiber outputs were approximately equal (a splitting ratio of about 50 percent) the application of axial tension and the heating were halted. Finally, a mechanical suppporting structure was added to the jacketless region 15 of the fibers 11 and 13 by epoxying the jacketless region within a slotted quartz glass tube 31 with epoxy bonds 33 and 35, as shown in FIG. 3(g). Heat-shrinkable tubing (not shown) was later applied over the glass tube 31 to keep contaminants away from the fibers 11 and 13.

TEST RESULTS

Figure 4:
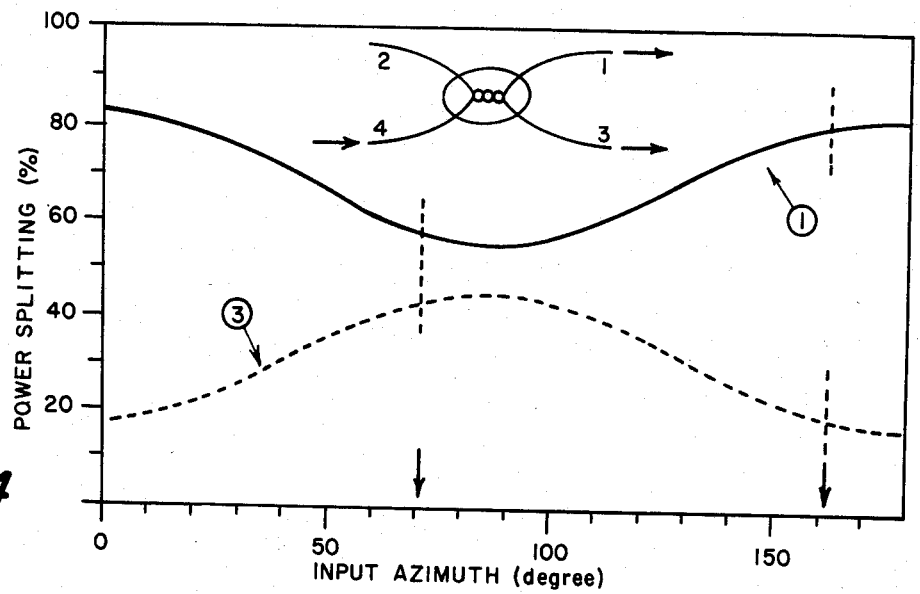
FIG. 4 is a plot of power division of a tested fiber coupler versus the input azimuth of a linear input to lead 4.

As previously stated, before fabrication of the coupler, the polarization vector in the output of the laser 25 was aligned on one of the birefringent axes of the through fiber 11 and coupler fabrication then proceeded until the through and tap fiber outputs were approximately equal. Subsequent rotation of the azimuth of the input polarization then varied the power splitting considerably. FIG. 4 shows the power splitting of the fiber coupler plotted against the input azimuth of a linear input to lead 4 in the inset. The polarization axes of the input lead are at 71 and 161 degrees. The splitting ratio varied from 43 to 57 percent for the input axis at 71 degrees, to 19 to 81 percent for the input axis at 161 degrees. The excess loss of the coupler was measured to be less than 0.2 dB.

Figure 5A:
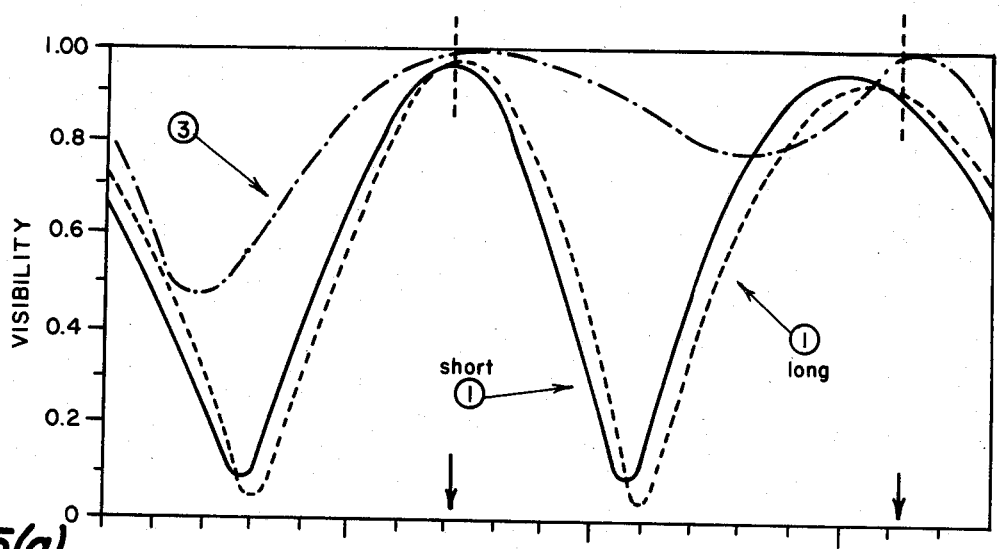
FIG. 5(a) is a plot of output visibility for the tested fiber coupler versus the input azimuth of a linear input to lead 4.

To show that the coupler preserved polarization, the output visibities for the through and tap fibers were measured as the azimuth of the input polarization was rotated. Typical data is shown in FIG. 5(a) which shows the output visibility for the coupler in the inset of FIG. 4 plotted against input azimuth of a linear input to lead 4. The output visibilities were all greater than or equal to 0.9 when the input was on a fiber polarization axis, indicating a near-linear polarization state. In addition, to verify that the output state was independent of the length of the output lead (a test to eliminate accidental linear output states that rely on a particular output lead length), the output leads were cut back, by some random length, several times and the output visibility was remeasured. As indicated in the example shown in FIG. 5(a), where the visibility for lead 1 is shown for two different lead lengths, this operation typically moved the maximum in the visibility within a range of +10 degrees from the input fiber axis.

Figure 5B:
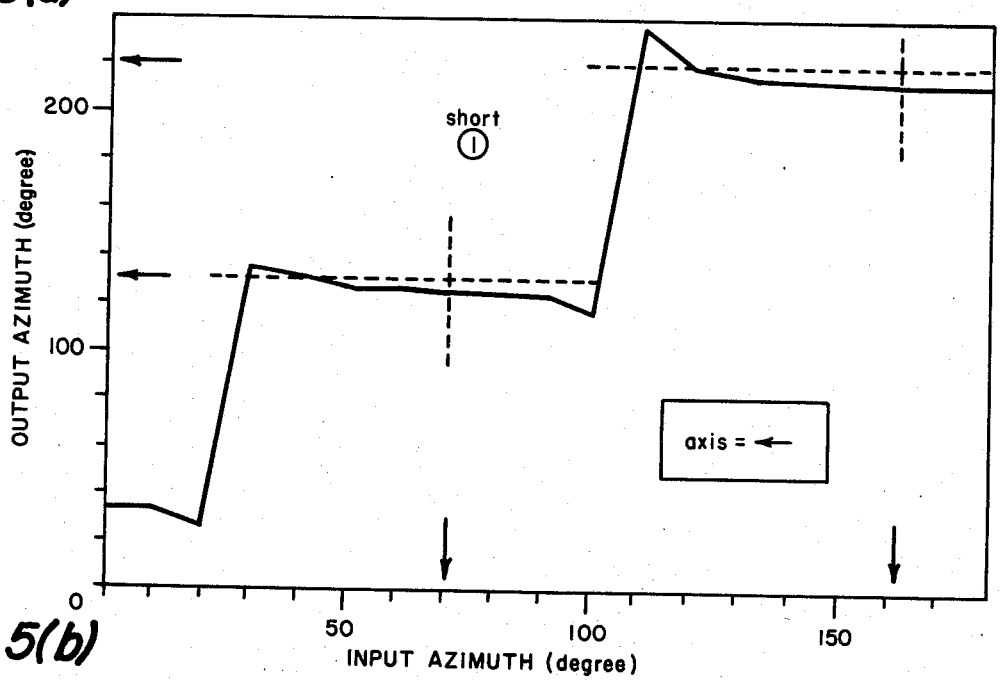
FIG. 5(b) is a plot of the corresponding output azimuth for lead 1 (short).

To demonstrate directly that the aximuth of a near-linear output state corresponds to an axis of the output lead, the output visibility and output azimuth relative to a polarizer following the lead were measured, lead 1 was cut between its end and the coupler, and the fiber axes of the severed section relative to the same polarizer were measured directly. This data is shown for output lead 1 in FIGS. 5( a) and 5(b). The visibility is shown in FIG. 5(a) and the corresponding azimuth vs. the input azimuth is shown in FIG. 5(b). The polarization axes of output lead 1 (short) are at 130 and 220 degrees. It is seen that in this example, when the input polarization is on an input axis, the aximuth of the corresponding near-linear output is within 5 to 6 degrees of the output fiber axis. This is direct evidence that the coupler did preseve linear polarization.

The test of a polarization-perserving coupler is how well it actually holds the polarization. A measure of polarization isolation is the quantity 10 log ($I_{min}/I_{max}$)=10 log $[(1-V)/(1+V)]$ in dB, where $I_{min}$ and $I_{max}$ are the minimum and maximum output intensities and V is the output visibility. With this definition, the output polarization isolation for the case of FIG. 5(a) ranges between 13 and 21 dB when the inputs are on axis.

Obviously, numerous modifications and variations of the present invention are possible in light of the above teachings. For example, variations of the etching step and the tapering and fusing step can be used to control the ($L/L_p$) ratio to impart the maximum isolation obtainable with fibers having longer beat lengths. It is therefore to be understood that within the scope of the appended claims, the invention may be practiced otherwise than as specifically described herein.

What is claimed as new and desired to be secured by Letters Patent of the United States is:

1. A method of fabricating a polarization-preserving single mode fiber coupler not requiring mutual alignment of the fiber polarization axes provided that the actual misalignment is not close to 90 degrees, comprising the steps of:
    (a) forming a jacketless region by removing protective jacket material from two or more polarization-preserving single-mode fibers, each fiber being birefringent and comprising at least a core, an inner cladding, and an assymetrical stress inducing layer outside of the inner cladding, such that the fibers have a birefringent beat length, and an outer cladding;
    (b) twisting the fibers around each other to bring them into intimate contact over the jacketless region in order to form a coupling length, said coupling length exceeding the said birefringent beat length of the fibers;
    (c) etching the outer cladding of the fibers in the said coupling length as far as possible without degrading the said birefringent beat length of the fibers;
    (d) heating the etched cladding to a temperature that is near the softening point of the fibers;
    (e) simultaneously applying axial tension to all the fibers to taper and fuse the said coupling length of the fibers;

2. The method of claim 1 wherein said coupling length is caused to exceed three times the said birefringent beat length.

3. A method of fabricating a polarization-preserving single mode fiber coupler not requiring mutual alignment of the fiber polarization axes provided that the actual misalignment is not close to 90 degrees, comprising the steps of:
    (a) forming a jacketless region by removing protective jacket material from two or more polarization-preserving single-mode fibers, each fiber being birefringent and comprising at least a core, an inner cladding, an assymetrical stress inducing layer outside of the inner cladding, such that each fiber has a birefringent beat length, and a birefringent axis, and an outer cladding;
    (b) twisting the fibers around each other to bring them into intimate contact over the jacketless region in order to form a coupling length, said coupling length exceeding the said birefringent beat length of the fibers;
    (c) partially etching the said outer cladding layer of the fibers in the said coupling region with a hydrofluoric acid solution, without degrading the said birefringent beat length of the fibers over their coupling length;
    (d) raising the temperature of the etched region close to the softening point of the fibers by heating the fibers in an oven;
    (e) simultaneously applying axial tension to all the fibers to taper and fuse the said coupling length of the fibers by securing the fibers to opposing translation blocks and translating the blocks apart;
    (f) aligning a polarized light source on the birefringent axis of one of the fibers to couple polarized light into said one of the fibers;
    (g) ceasing to heat and apply the axial tension when polarized light coupled into said one of the fibers is split a desired amount by the coupler.

* * * * *